United States Patent
Ishida

(10) Patent No.: US 10,131,291 B2
(45) Date of Patent: Nov. 20, 2018

(54) ASSEMBLY-TYPE VEHICLE COMPONENT

(71) Applicant: DAIWA KASEI INDUSTRY CO., LTD., Aichi (JP)

(72) Inventor: Yohei Ishida, Aichi (JP)

(73) Assignee: DAIWA KASEI INDUSTRY CO., LTD., Aichi (JP)

(*) Notice: Subject to any disclaimer, the term of this patent is extended or adjusted under 35 U.S.C. 154(b) by 0 days.

(21) Appl. No.: 15/627,633

(22) Filed: Jun. 20, 2017

(65) Prior Publication Data
US 2018/0022289 A1 Jan. 25, 2018

(30) Foreign Application Priority Data
Jul. 25, 2016 (JP) .................. 2016-145481

(51) Int. Cl.
| B60R 11/00 | (2006.01) |
| F16B 5/12 | (2006.01) |
| B60R 16/02 | (2006.01) |
| F16B 37/04 | (2006.01) |

(52) U.S. Cl.
CPC .............. *B60R 11/00* (2013.01); *F16B 5/126* (2013.01); *B60R 16/0215* (2013.01); *B60R 2011/0043* (2013.01); *F16B 37/046* (2013.01)

(58) Field of Classification Search
CPC ............ B60R 11/00; B60R 2011/0043; B60R 16/0215; F16B 5/126; F16B 37/046
See application file for complete search history.

(56) References Cited

U.S. PATENT DOCUMENTS

| 4,386,752 A * | 6/1983 | Pavlak .................. F16L 3/127 24/543 |
| 4,564,163 A * | 1/1986 | Barnett .................. F16L 3/12 24/16 PB |
| 5,971,330 A * | 10/1999 | Noba .................... F16L 3/04 248/56 |
| 8,020,812 B2 * | 9/2011 | Matsuno ............. F16L 3/1075 24/336 |
| 8,286,923 B2 * | 10/2012 | Kobayashi .......... B60R 16/0215 24/530 |
| 8,601,649 B2 * | 12/2013 | Klein ................. F16B 21/084 24/289 |

(Continued)

FOREIGN PATENT DOCUMENTS

JP 2015-205568 A 11/2015

*Primary Examiner* — Robert Sandy
*Assistant Examiner* — Louis A Mercado
(74) *Attorney, Agent, or Firm* — McClure, Qualey & Rodack, LLP

(57) ABSTRACT

An assembly-type vehicle component 1A, 1B used by assembling one of functional members 3A, 3B having predetermined functions to a mounting member 2 to be mounted to a vehicle body side is configured to allow two types of functional members 3B, 3A to be assembled to the fitting portion 20 of the mounting member 2 so as to be in a detachment-prevented state, and the mounting member 2 has a rattling preventing protrusion 25U for pressing the assembled functional member 3A, and a rattling preventing protrusion 25D for pressing the assembled functional member 3B. Each functional member 3A, 3B has a reception portion 36A, 36B (i.e., gap 37A, 37B) for receiving the rattling preventing protrusion 25D, 25U that is irrelevant to the functional member, so as not to cause pressing.

2 Claims, 14 Drawing Sheets

(56) References Cited

U.S. PATENT DOCUMENTS

| | | | | |
|---|---|---|---|---|
| 8,720,832 B2* | 5/2014 | Negel | ................ | B60R 16/0215 |
| | | | | 248/71 |
| 8,763,212 B2* | 7/2014 | Scroggie | ............... | F16B 5/0628 |
| | | | | 24/297 |
| 8,827,214 B2* | 9/2014 | Ogawa | ................ | F16L 3/1041 |
| | | | | 248/74.1 |
| 9,181,966 B2* | 11/2015 | Ogawa | ...................... | F16L 3/13 |
| 9,302,632 B2* | 4/2016 | Yamamoto | ............ | B60R 13/025 |
| 9,539,976 B2* | 1/2017 | Jinnai | ............... | B60R 21/23138 |
| 9,653,901 B2* | 5/2017 | Miyamoto | ............ | F16L 3/1075 |
| D789,779 S * | 6/2017 | Asai | .................... | B60R 16/0215 |
| | | | | D8/396 |
| 9,669,770 B1* | 6/2017 | Schlaupitz | .......... | B60R 16/0215 |
| 9,669,778 B2* | 6/2017 | Satou | .................. | B60R 16/0215 |
| 9,709,084 B2* | 7/2017 | Kato | .................... | F16B 5/0614 |
| 9,896,252 B2* | 2/2018 | Kato | ................. | B65D 63/1072 |

\* cited by examiner

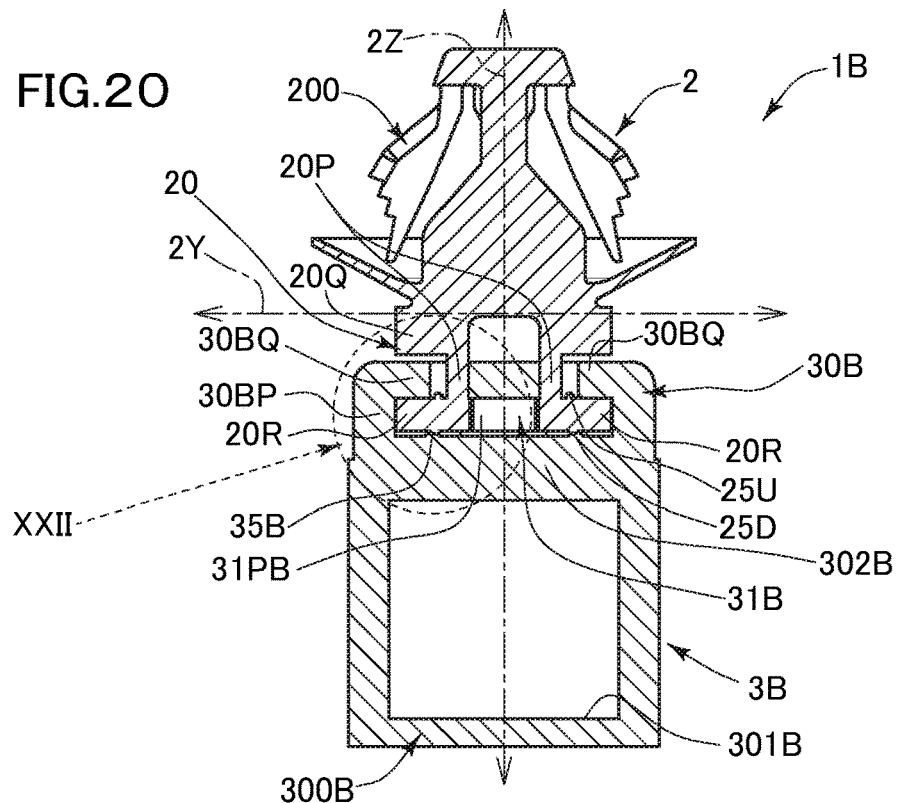
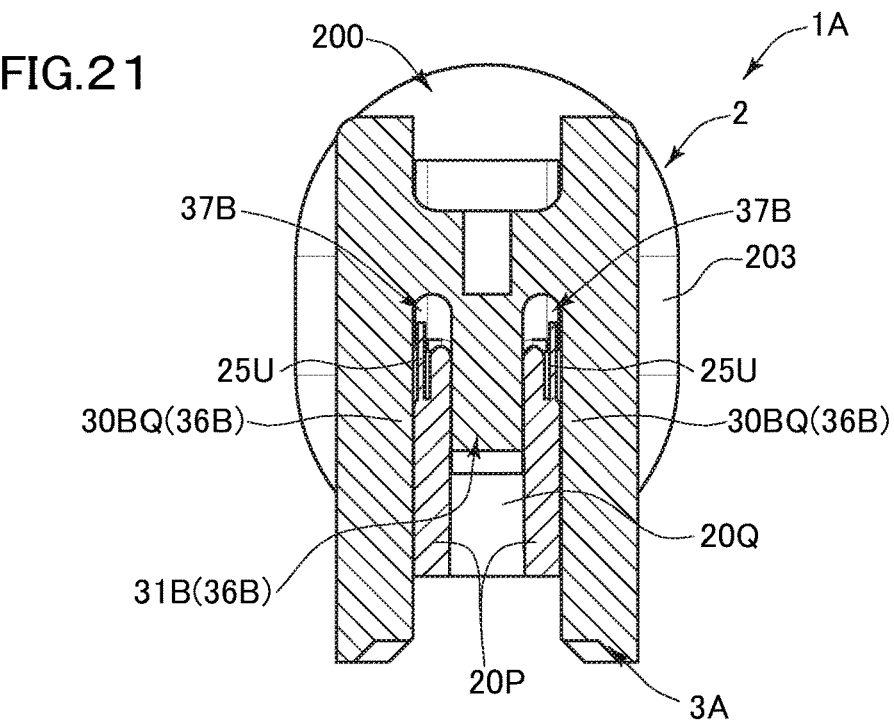

ASSEMBLY-TYPE VEHICLE COMPONENT

RELATED APPLICATIONS

This application claims the priority of Japanese Patent Application No. 2016-145481 filed on Jul. 25, 2016. The disclosure of the prior application is hereby incorporated herein in the entirety by reference.

BACKGROUND OF THE INVENTION

Field of the Invention

This invention relates to an assembly-type vehicle component used with a plurality of members assembled.

Description of Related Art

For example, a vehicle component is used by assembling two members of a mounting member to be mounted to the vehicle body side and a functional member having a predetermined function (see Japanese Laid-Open Patent Publication No. 2015-205568). Examples of functional members include a connector to which a counterpart connector having a predetermined shape is connected, and a clamp for holding a wire harness. Such a functional member is provided with a detachment preventing engagement portion configured to be engaged with an engagement portion of the mounting member to bring the mounting member into a detachment-prevented state, thereby enabling the functional member and the mounting member to be assembled by fitting. Thus, even if there are plural variations of functional members, it is possible to mount these functional members to the vehicle body by the same mounting member.

In order to prevent occurrence of high sliding resistance at the time of assembling the mounting member and the functional member by fitting, such an assembly-type vehicle component is designed such that a slight gap is provided between parts adjacent to each other of the respective members. However, due to such a gap, rattling occurs between both members, so that unusual sound occurs by vehicle travelling vibration or the like.

An object of this invention is to prevent occurrence of rattling in an assembled state of an assembly-type vehicle component that allows the same mounting member to be assembled to a plurality of functional members.

SUMMARY OF THE INVENTION

In order to achieve the above object, an assembly-type vehicle component includes: a mounting member configured to be mounted to a vehicle body side; and a functional member having a predetermined function, wherein the mounting member is provided with a detachment preventing engagement portion configured to be engaged with an engagement portion of the functional member to bring the functional member into a detachment-prevented state, the functional member includes, as the engagement portion, an elastic engagement portion configured to, when being caused to approach in a predetermined direction toward the detachment preventing engagement portion, ride over the detachment preventing engagement portion while being elastically deformed in a direction perpendicular to the predetermined direction, and after riding over the detachment preventing engagement portion, be elastically restored to be engaged with the detachment preventing engagement portion, thereby establishing the detachment-prevented state with respect to the mounting member, the functional member including: a first functional member in which the elastic deformation of the elastic engagement portion is caused in a first elastic deformation direction; and a second functional member in which the elastic deformation of the elastic engagement portion is caused in a second elastic deformation direction opposite to the first elastic deformation direction, each of the first functional member and the second functional member being capable of being brought into the detachment-prevented state with respect to the mounting member, the mounting member includes: a first rattling preventing protrusion protruding in the second elastic deformation direction and configured to press, in the second elastic deformation direction, the first functional member in the detachment-prevented state; and a second rattling preventing protrusion protruding in the first elastic deformation direction and configured to press, in the first elastic deformation direction, the second functional member in the detachment-prevented state, the first functional member includes a first reception portion configured to receive the second rattling preventing protrusion so as not to cause pressing to the first functional member when the first functional member is in the detachment-prevented state with respect to the mounting member, and the second functional member includes a second reception portion configured to receive the first rattling preventing protrusion so as not to cause pressing to the second functional member when the second functional member is in the detachment-prevented state with respect to the mounting member.

In the above configuration, the mounting member is provided with the rattling preventing protrusion protruding in the direction opposite to the elastic deformation direction of the elastic engagement portion of the assembled functional member and configured to press the functional member. Thus, when the functional member is assembled to the mounting member, the functional member is brought into an elastically deformed state by being pressed by the rattling preventing protrusion. Then, by an elastic restoration force of the elastic deformation caused by pressing the functional member, the mounting member is clamped and pressurized. Thus, rattling between the functional member and the mounting member can be prevented.

However, in the above configuration, it is possible to assemble, to the mounting member, two types of functional members in which the elastic engagement portions are elastically deformed in different directions at the time of assembling. Therefore, the mounting member is provided with two rattling preventing protrusions corresponding to the two types of functional members. Each functional member has a structure for avoiding a pressing force of the irrelevant rattling preventing protrusion, i.e., the reception portion for receiving the irrelevant rattling preventing protrusion, so that only the relevant rattling preventing protrusion works and the irrelevant rattling preventing protrusion does not work when the functional member is assembled to the mounting member. Thus, a force needed in assembling is prevented from being increased by both of the two rattling preventing protrusions working.

In the above configuration, the first functional member and the second functional member each have gaps on both sides, of each elastic engagement portion, in a perpendicular direction perpendicular to the predetermined direction and the elastic deformation direction, and the gaps can be used as the respective reception portions. The elastic engagement portions of the first functional member and the second functional member need to have such a shape that their protruding ends are formed as free ends in order to allow elastic deformation of these elastic engagement portions. For this purpose, it is necessary to provide gaps on both sides in a direction perpendicular to the protruding direction, on the distal end side in the protruding direction. By using these gaps as the reception portions for the rattling preventing protrusions, it becomes unnecessary to newly form reception portions.

BRIEF DESCRIPTION OF THE DRAWINGS

FIG. 2 is mounted to a vehicle body;

FIG. 20 is a XX-XX sectional view in FIG. 18;

FIG. 21 is a XXI-XXI sectional view in FIG. 19;

DESCRIPTION OF THE PREFERRED EMBODIMENTS

Figure 1:
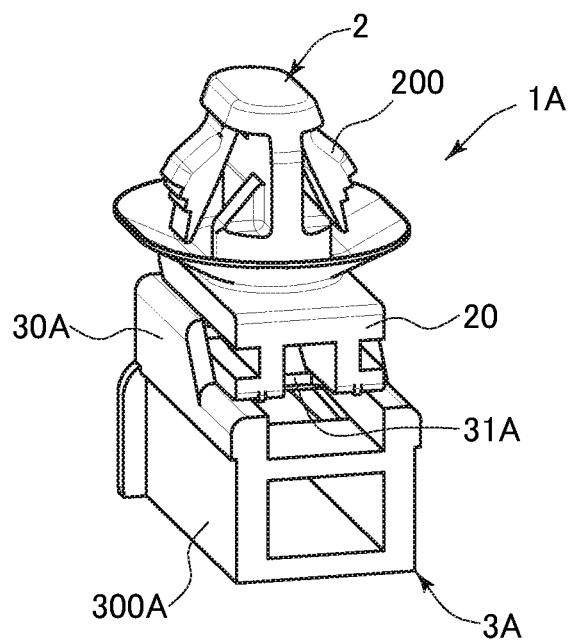
FIG. 1 is a perspective view showing an assembly-type vehicle component according to one embodiment of this invention, in which a first functional member is assembled to a mounting member.

Hereinafter, embodiments of this invention will be described with reference to examples shown in the drawings.

Figure 2:
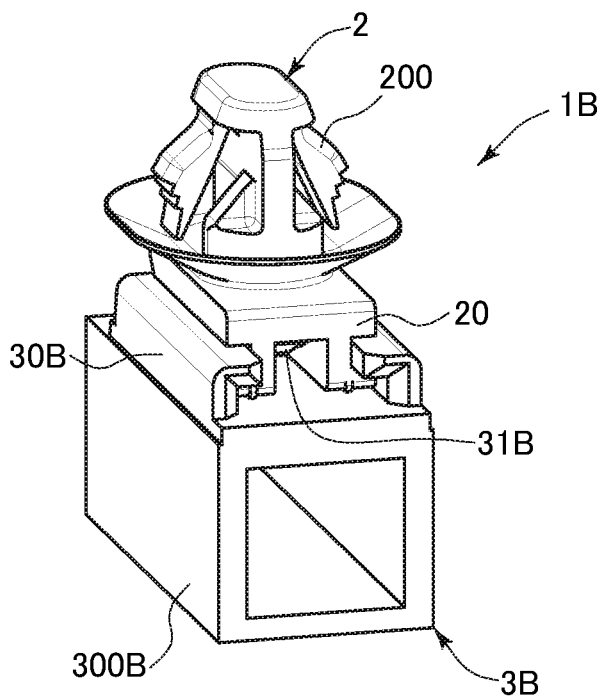
FIG. 2 is a perspective view showing an assembly-type vehicle component according to another embodiment of this invention, in which a second functional member is assembled to the mounting member shown in FIG. 1.

As shown in FIG. 1 and FIG. 2, assembly-type vehicle components 1A, 1B of the embodiments are used in a state in which a functional member 3A or a functional member 3B each having a predetermined function is assembled to a mounting member 2 to be mounted to the vehicle body side.

Figure 3:
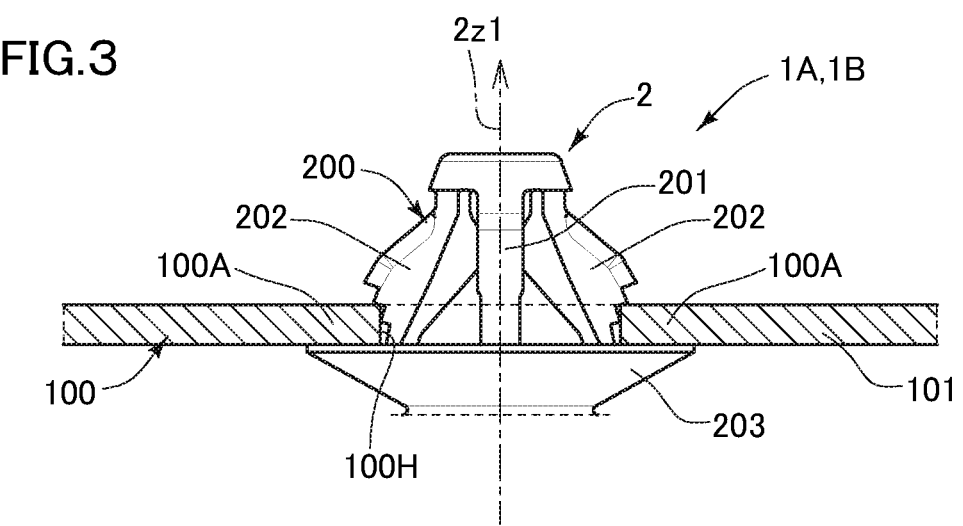
FIG. 3 is a view showing a state in which the assembly-type vehicle component shown in FIG. 1

As shown in FIG. 3, the mounting member 2 has a vehicle body mounting portion 200 configured to be inserted into an attachment hole 100H provided in a panel 101 of a vehicle body 100 and to be mounted so as to be prevented from being detached in an a direction opposite to the insertion direction. The vehicle body mounting portion 200 here has: a shaft portion 201 extending in an upward direction $2z1$; elastic locking pieces 202, 202 which expand so as to be separated from the shaft portion 201 as approaching the base end side (i.e., lower side) of the shaft portion 201 from the distal end (i.e., upper end) thereof; and a contact portion 203 opposed to the distal end sides of the elastic locking pieces 202, 202. The elastic locking pieces 202, 202 are capable of elastically deforming so that the distal end sides thereof are narrowed to approach the shaft portion 201, using the joint part to the shaft portion 201 as a basis. The contact portion 203 is a flange portion expanding so as to be separated from the shaft portion 201 as approaching the distal end side of the shaft portion 201 from the base end thereof.

In order to attach the mounting member 2 to the attachment hole 100H on the vehicle body 100 side, first, the elastic locking pieces 202, 202 are elastically deformed to be narrowed so as to approach the shaft portion 201, and in this state, the vehicle body mounting portion 200 is inserted into the attachment hole 100H on the vehicle body 100 side. Then, after passing through the attachment hole 100H, the elastic locking pieces 202, 202 are elastically restored. As a result of the elastic restoration, the elastic locking pieces 202, 202 that have reached the back side of the attachment hole 100H while being narrowed expand outward and come into contact with a peripheral portion 100A of the attachment hole 100H from the back side. On the other hand, on the front side of the attachment hole 100H, the contact portion 203 comes into contact with the peripheral portion 100A of the attachment hole 100H. Owing to the contacts from both front and back sides, the mounting member 2 is mounted to the vehicle body 100 in a detachment prevented state so as to sandwich the peripheral portion 100A of the attachment hole 100H. Meanwhile, the mounting member 2 allows each functional member 3A, 3B to be assembled thereto. Thus, it is possible to attach, to the attachment hole 100H, the functional member 3A, 3B assembled to the mounting member 2, that is, mount the functional member 3A, 3B to the vehicle body 100 side.

It is noted that the vehicle body mounting portion 200 may have other shapes as long as the vehicle body mounting portion 200 can be mounted to the vehicle body 100 side.

Figure 8:
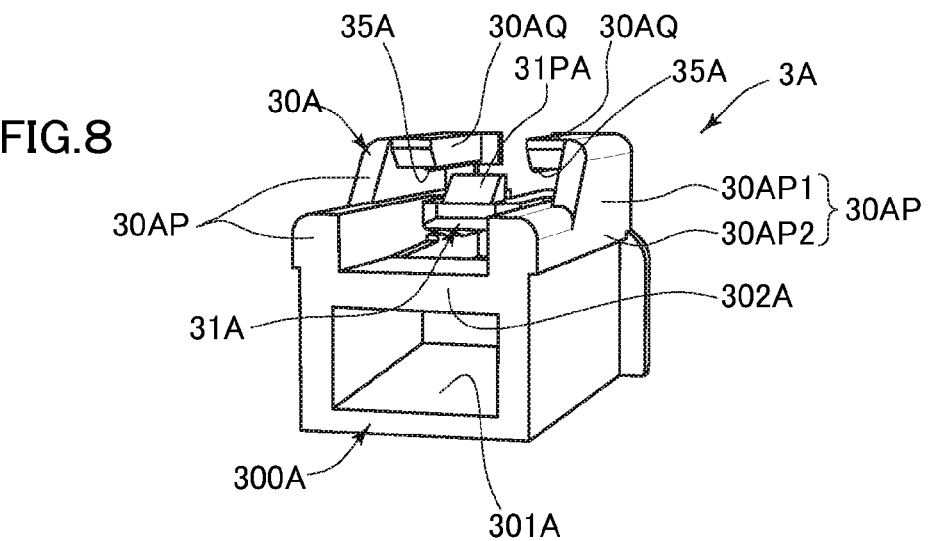
FIG. 8 is a perspective view of the first functional member shown in FIG. 1.
Figure 10:
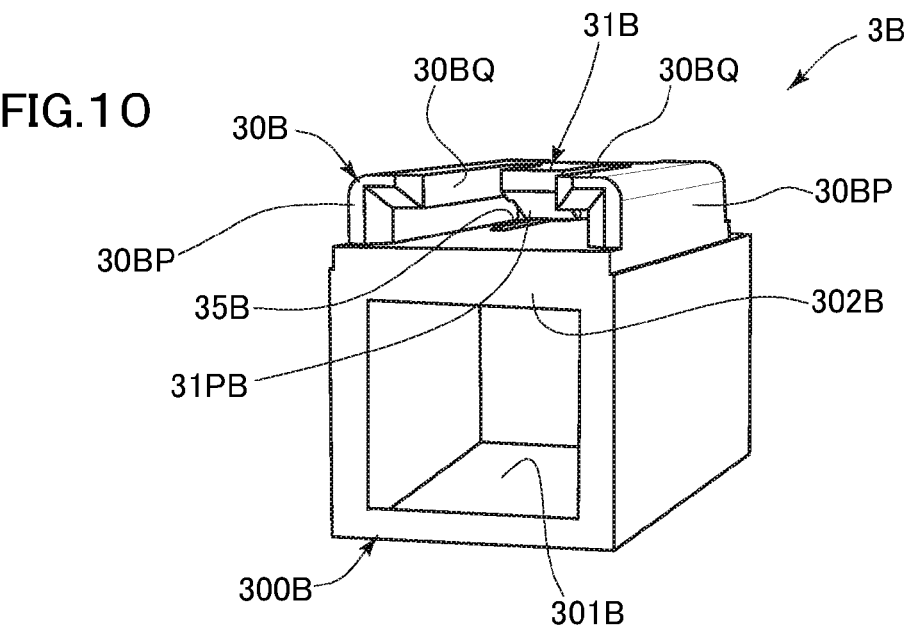
FIG. 10 is a perspective view of the second functional member shown in FIG. 2.

As shown in FIG. 8 and FIG. 10, the functional members 3A, 3B include two types of a first functional member 3A and a second functional member 3B. The mounting member 2 allows each of the first functional member 3A and the second functional member 3B to be assembled thereto. It is noted that the functional members of this invention may include more than two types.

Here, the assembly structure of the mounting member 2 and each of the first functional member 3A and the second functional member 3B will be described.

As shown in FIG. 4 to FIG. 7, the mounting member 2 includes a fitting portion 20 and a detachment preventing engagement portion 21 in addition to the aforementioned vehicle body mounting portion 200. In the mounting member 2 here, the fitting portion 20 is provided on the lower side of the vehicle body mounting portion 200.

The fitting portion 20 is fitted to one of the first functional member 3A and the second functional member 3B, to be in an assembled state. However, the fitting portion 20 is capable of being fitted to both of the first functional member 3A and the second functional member 3B.

Figure 4:
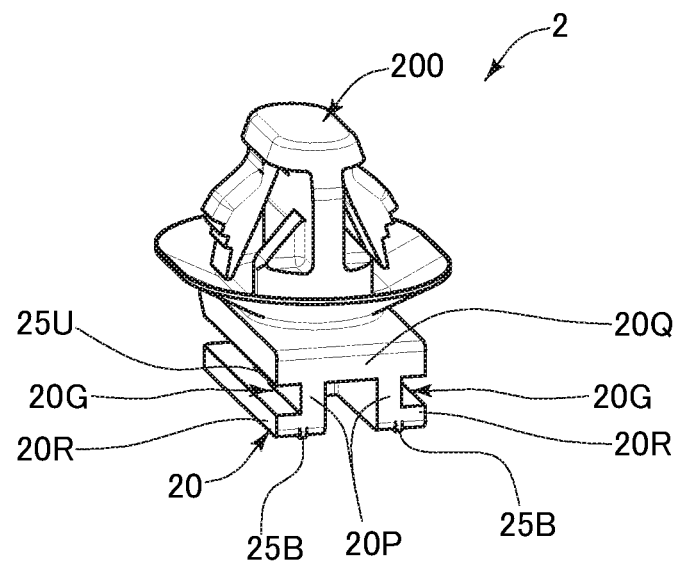
FIG. 4 is a first perspective view showing the mounting member shown in FIG. 1 and FIG. 2.
Figure 17:
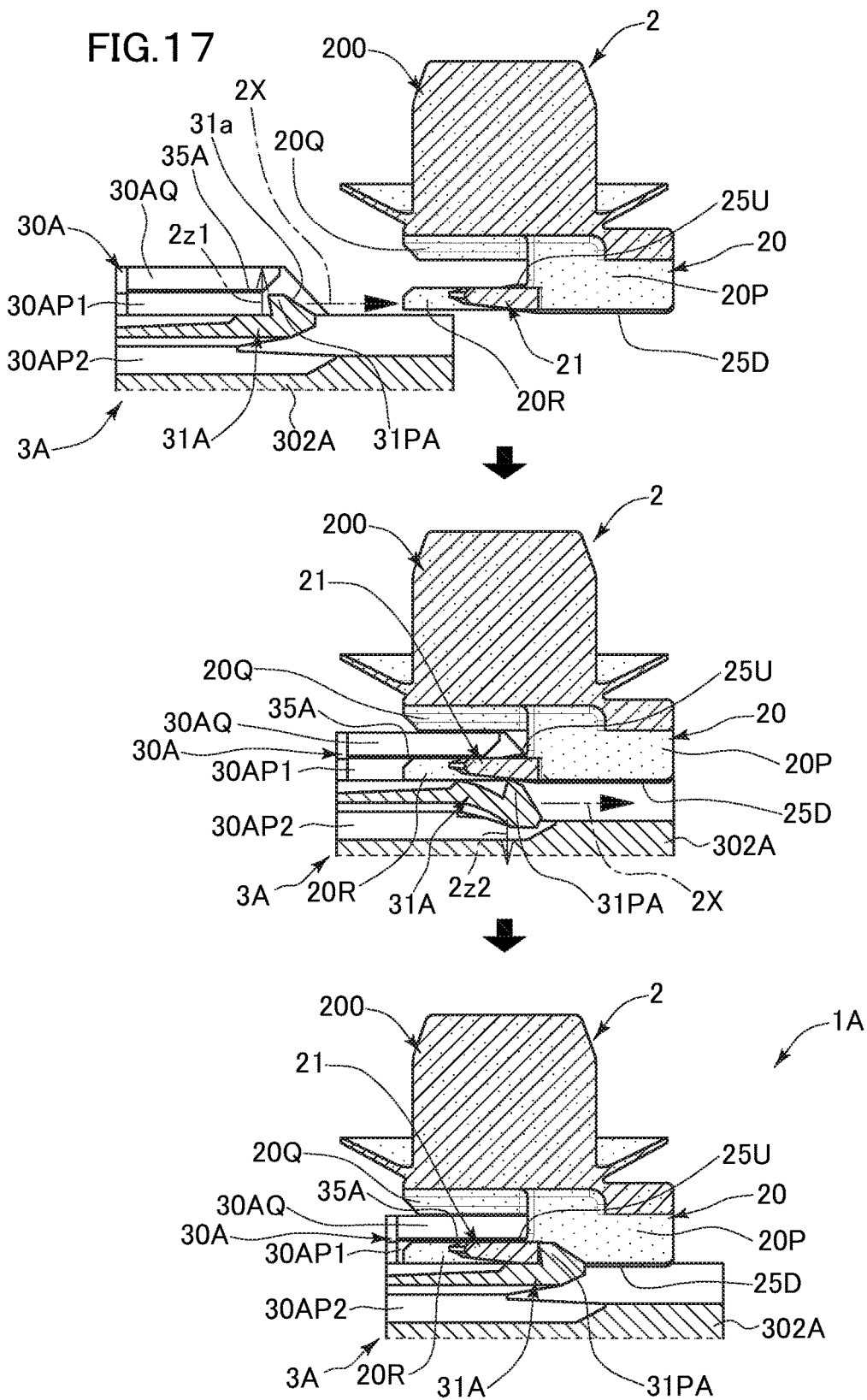
FIG. 17 illustrates assembling of the mounting member and the first functional member, using an XVII-XVII sectional view in FIG. 13.
Figure 23:
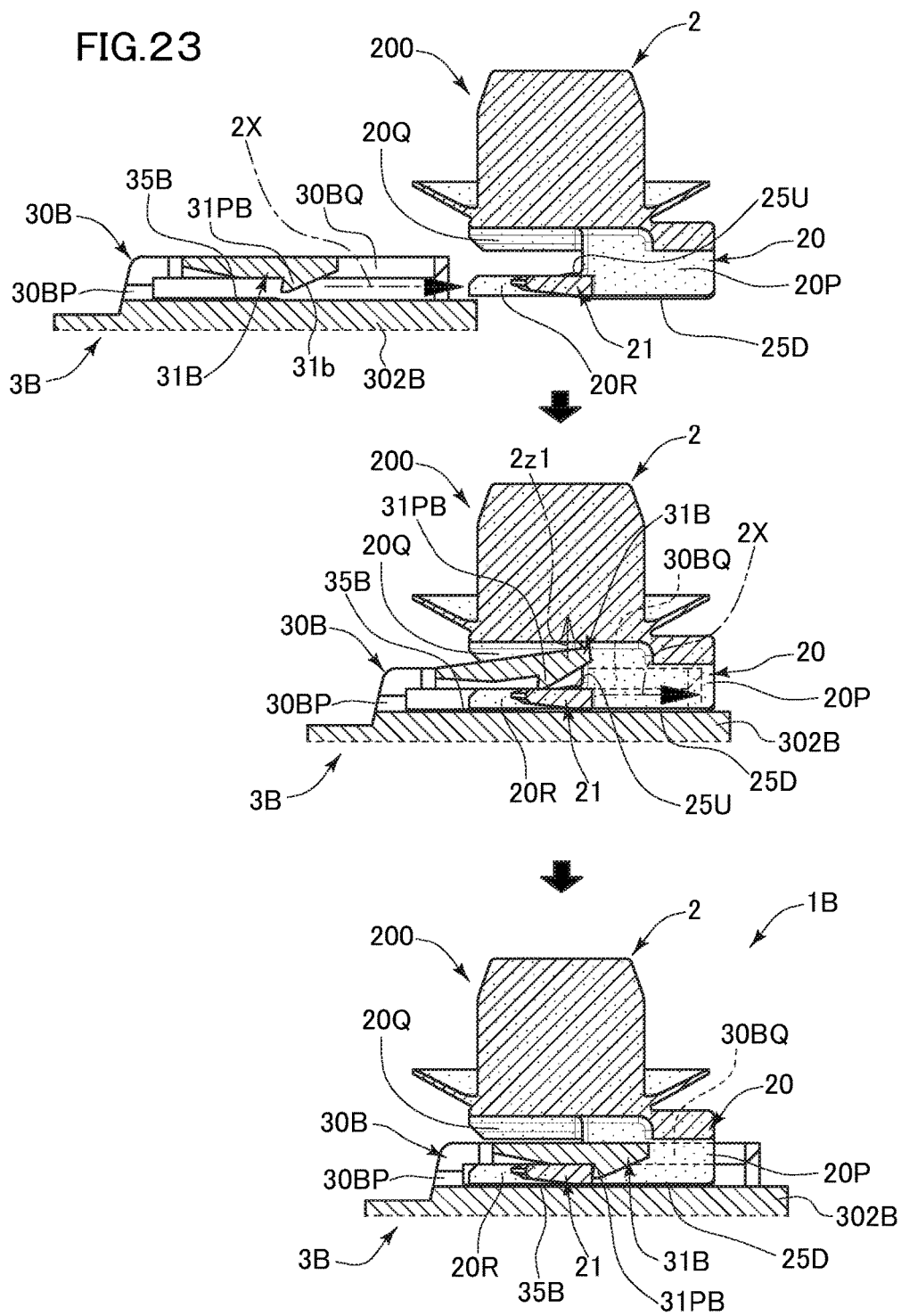
FIG. 23 illustrates assembling of the mounting member and the second functional member, using a XXIII-XXIII sectional view in FIG. 19.

As shown in FIG. 4, the fitting portion 20 here has opposed wall portions 20P, 20P opposed to each other in a direction 2Y (see FIG. 6: hereinafter, may be referred to as an opposing direction) perpendicular to a predetermined assembling direction 2X (see FIG. 7: predetermined direction in this invention) in which the first functional member 3A or the second functional member 3B is assembled to the mounting member 2. In addition, as shown in FIG. 4 to FIG. 7, the fitting portion 20 has: an upper wall portion 20Q located on the upper side of the opposed wall portions 20P, 20P; and lower opposed portions 20R, 20R located on the lower side thereof. The upper wall portion 20Q is connected to the lower side of the vehicle body mounting portion 200, and expands in a quadrangular shape so as to be elongated in the assembling direction 2X, in a plane perpendicular to the up-down direction 2Z (see FIG. 6 and FIG. 7: which can be also said to be a height direction). The opposed wall portions 20P, 20P extend downward from the lower surface of the upper wall portion 20Q while being opposed to each other in the opposing direction 2Y. As shown in FIG. 17 and FIG. 23, the opposed wall portions 20P, 20P here are formed locally on the far side (right side in the drawing) in the assembling direction 2X. The lower opposed portions 20R, 20R respectively expand from the lower ends of the opposed wall portions 20P, 20P outward in the opposing direction 2Y.

Figure 6:
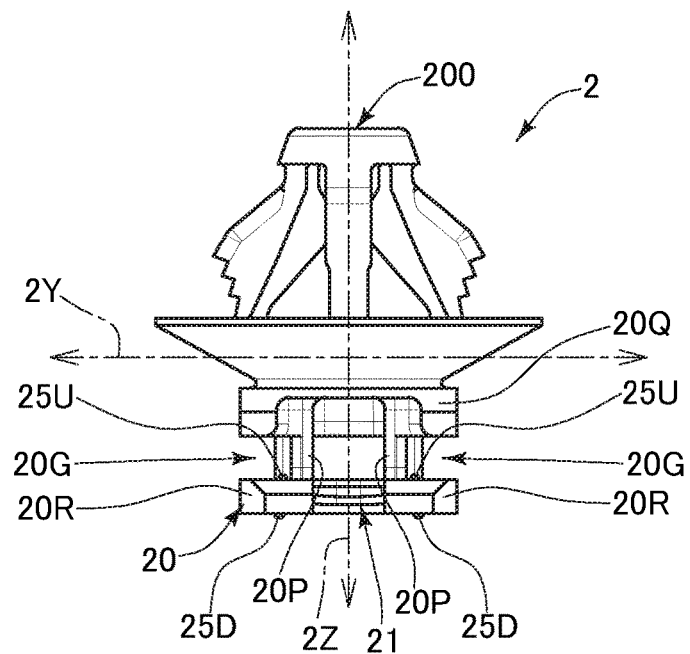
FIG. 6 is a front view of the mounting member shown in FIG. 4.

As shown in FIG. 6, the upper wall portion 20Q and each lower opposed portion 20R, 20R protrude outward in the opposing direction 2Y with respect to the opposed wall portions 20P, 20P, and are opposed to each other in the up-down direction 2Z outside in the opposing direction 2Y of the opposed wall portions 20P, 20P. The fitting portion 20 forms a recessed portion by the above opposing shape, and at the time of assembling the first functional member 3A or the second functional member 3B to the mounting member 2, the recessed portion functions as a guide portion (i.e., mounting-member-side guide recessed portion) for guiding the assembling.

Figure 5:
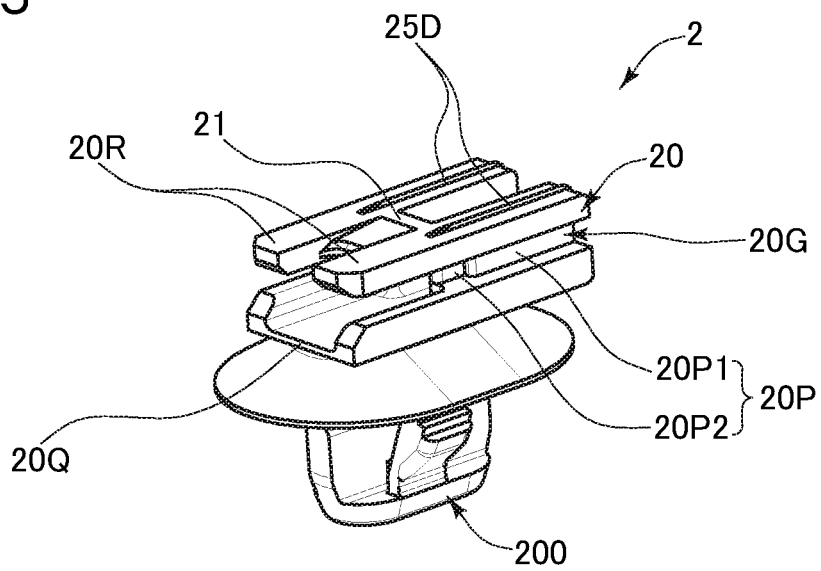
FIG. 5 is a second perspective view of the mounting member shown in FIG. 4, as seen from another direction.

The detachment preventing engagement portion 21 is configured to be engaged with an engagement portion 31A, 31B of the first functional member 3A or the second functional member 3B, whereby the engaged functional member 3A, 3B is brought into a detachment-prevented state. As shown in FIG. 5 and FIG. 6, the detachment preventing engagement portion 21 here is provided as a connection wall portion connecting the opposed wall portions 20P, 20P at the lower end side thereof. In addition, as shown in FIG. 17 and FIG. 23, the detachment preventing engagement portion 21 has such a shape as to be tapered toward the near side in the assembling direction 2X of the functional member 3A, 3B. The fitting portion 20 here forms a tube-shaped space between the opposed wall portions 20P, 20P opposed to each other and between the detachment preventing engagement portion 21 and the upper wall portion 200 opposed to each other.

As shown in FIG. 8 to FIG. 11, the functional members 3A, 3B include fitting portions 30A, 30B, elastic engagement portions 31A, 31B, and connector portions 300A, 300B serving as predetermined function portions, respectively.

It is noted that the connector portion 300A of the first functional member and the connector portion 300B of the second functional member are different not only in their connection shapes for counterpart connectors but also in their heights in the up-down direction 2Z. In addition, in the connector portions 300A, 300B, opening portions 301A, 301B for connection with the counterpart connectors (not shown) have, therein, structures such as engagement nails for attachment with the counterpart connectors. However, in the drawings, the structure is not shown in detail, but shown in a simple manner. The opening portions 301A, 301B for connection may have known opening shapes that allow connection with the counterpart connectors.

Figure 12:
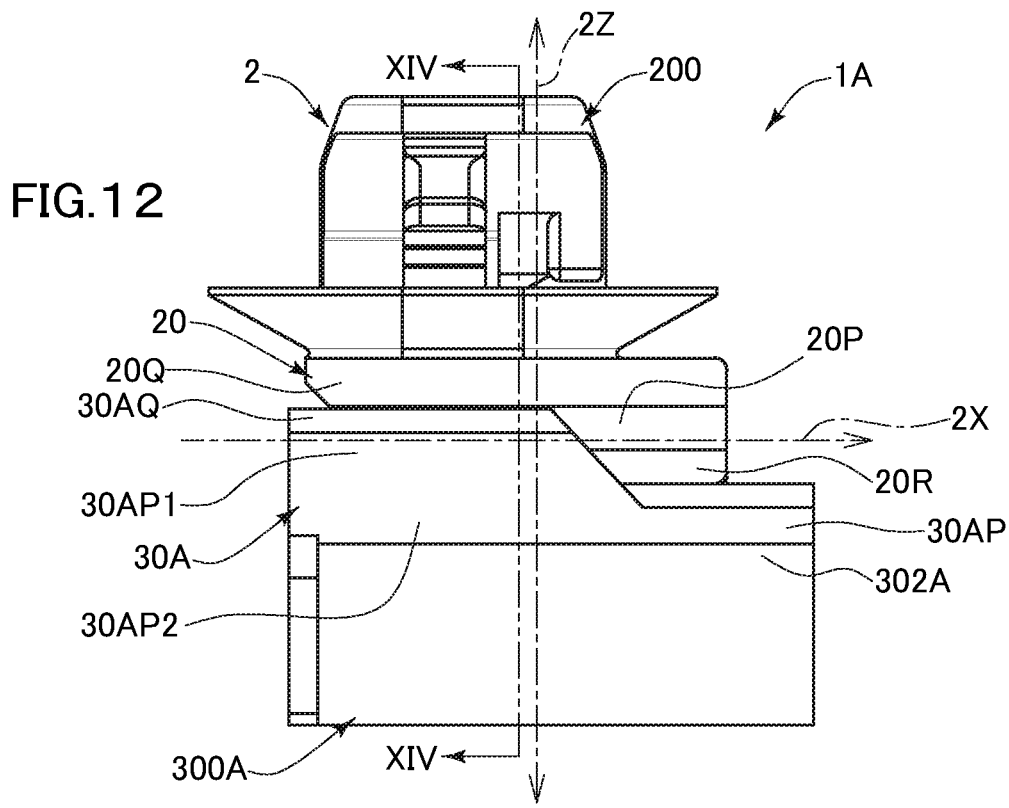
FIG. 12 is a left side view of the assembly-type vehicle component shown in FIG. 1.
Figure 13:
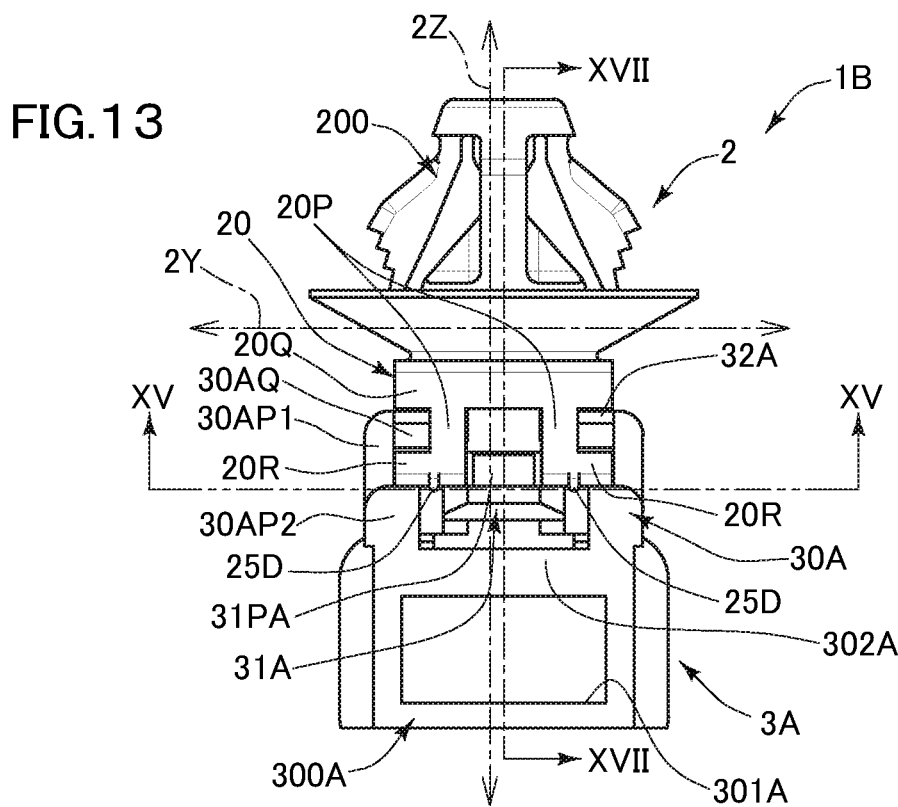
FIG. 13 is a front view of the assembly-type vehicle component shown in FIG. 12.
Figure 18:
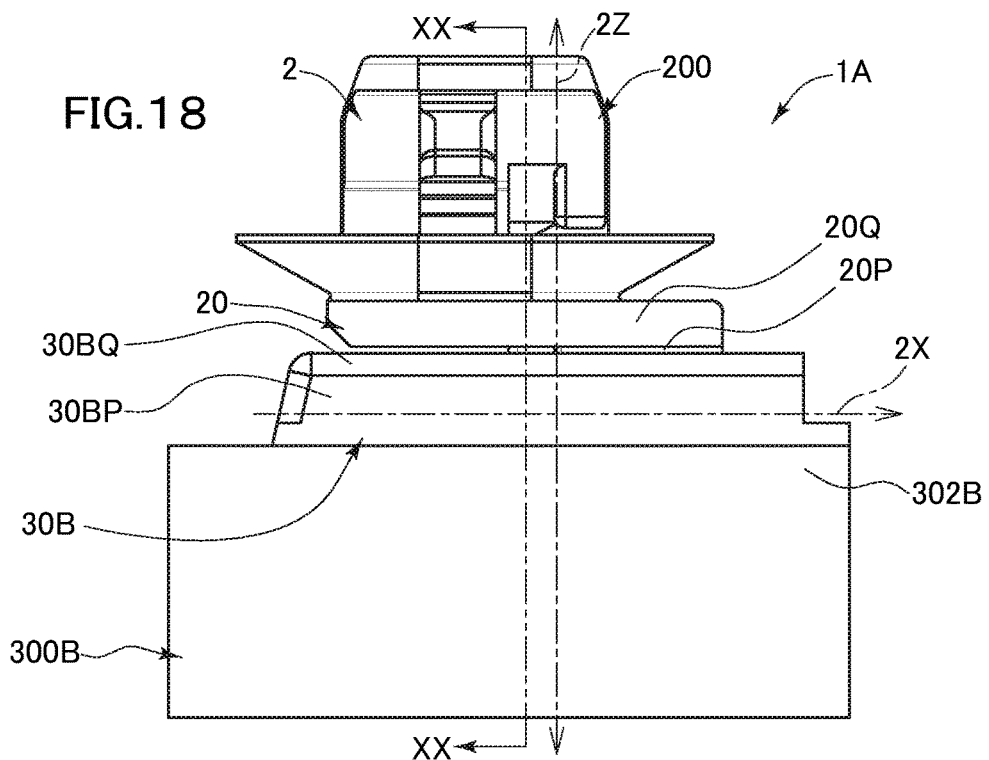
FIG. 18 is a left side view of the assembly-type vehicle component shown in FIG. 2.
Figure 19:
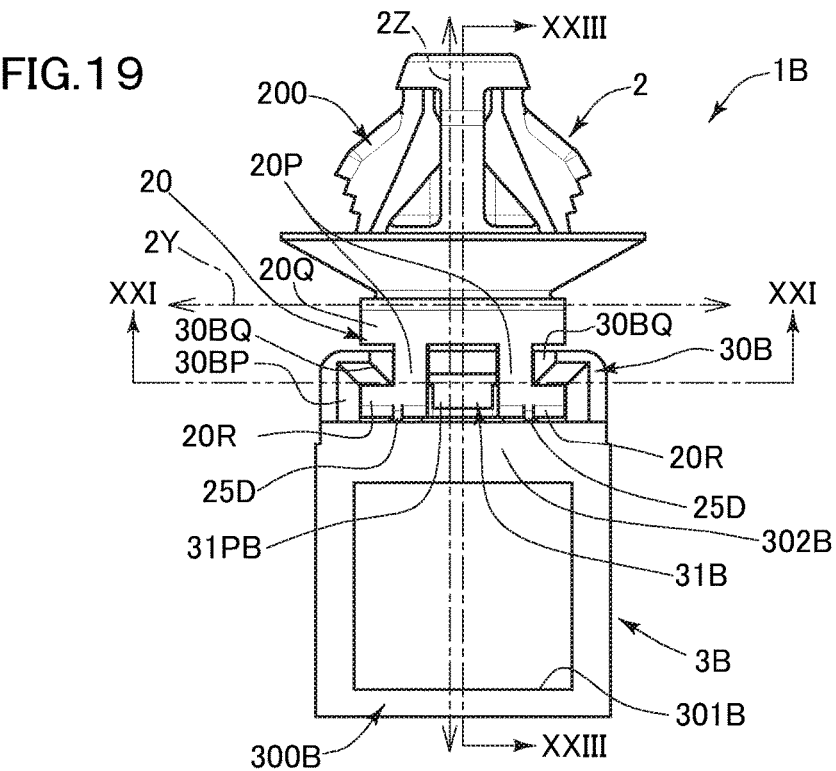
FIG. 19 is a front view of the assembly-type vehicle component shown in FIG. 18.

The fitting portion 30A of the first functional member 3A has opposed wall portions 30AP, 30AP, upper opposed portions 30AQ, 30AQ, and an upper end portion 302A of the connector portion 300A. On the other hand, the fitting portion 30B of the second functional member 3B has opposed wall portions 30BP, 30BP, upper opposed portions 30BQ, 30BQ, and an upper end portion 302B of the connector portion 300B. As shown in FIG. 12 and FIG. 18, the opposed wall portions 30AP, 30AP and the opposed wall portions 30BP, 30BP are wall portions extending in the assembling direction 2X and standing upward from both sides in the opposing direction 2Y on the upper end portions 302A, 302B of the connector portions 300A, 300B.

Figure 9:
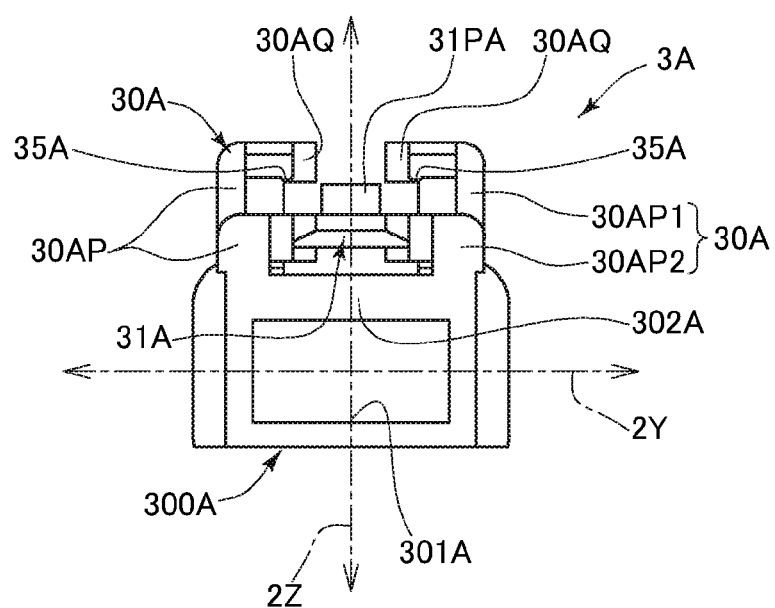
FIG. 9 is a front view of the first functional member shown in FIG. 8.

As shown in FIG. 8 and FIG. 9, the upper opposed portions 30AQ, 30AQ of the first functional member 3A are bent end portions extending inward in the opposing direction 2Y on the distal end sides (i.e., upper end sides) of the opposed wall portions 30AP, 30AP. Each opposed wall portion 30AP, 30AP has: a lower opposed wall portion 30AP2 standing upward from the upper end portion 302A of the connector portion 300A; and an upper opposed wall portion 30AP1 leading to the upper opposed portion 30AQ. The lower opposed wall portions 30AP2 have a shape protruding inward in the opposing direction 2Y with respect to the upper opposed wall portions 30AP1, and have upper surfaces opposed to the respective upper opposed portions 30AQ, 30AQ in the up-down direction 2Z. A storage space for storing the elastic engagement portion 31A when the elastic engagement portion 31A is elastically deformed downward is formed between the lower opposed wall portions 30AP2, 30AP2 opposed to each other. The fitting portion 30A of the first functional member 3A forms a recessed portion by the above opposing shape, and when the first functional member 3A is assembled to the mounting member 2, the recessed portion functions as a guide portion (i.e., functional-member-side guide recessed portion) for guiding the assembling.

Figure 11:
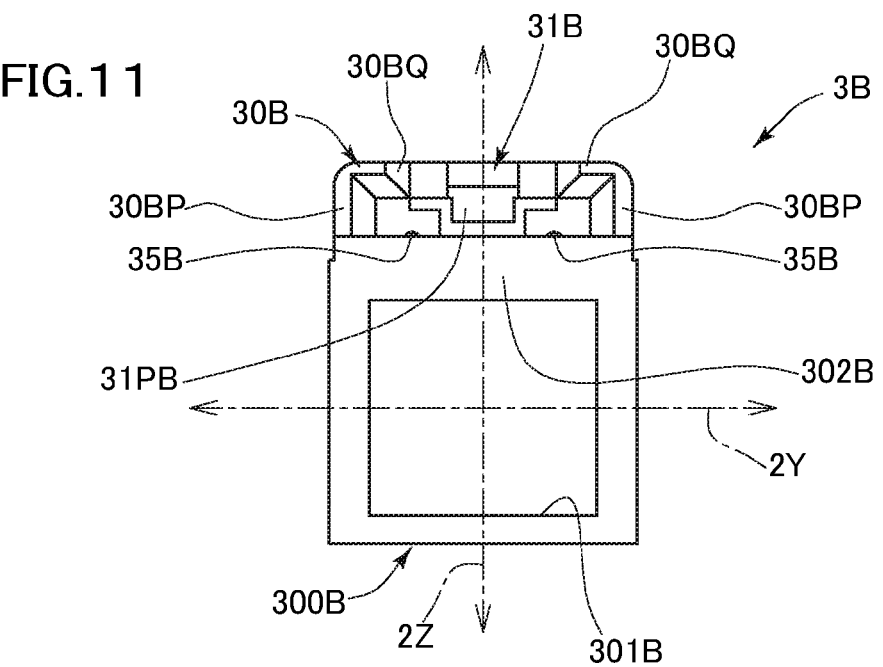
FIG. 11 is a front view of the second functional member shown in FIG. 10.

As shown in FIG. 10 and FIG. 11, the upper opposed portions 30BQ, 30BQ of the second functional member 3B are bent end portions extending inward in the opposing direction 2Y with respect to the opposed wall portions 30BP, 30BP on the distal end sides (i.e., upper end sides) of the opposed wall portions 30BP, 30BP. The upper opposed portions 30BQ, 30BQ are opposed to the upper surface of the upper end portion 302B of the connector portion 300B in the up-down direction 2Z. The fitting portion 30B of the second functional member 3B forms a recessed portion by the above opposing shape, and when the second functional member 3B is assembled to the mounting member 2, the recessed portion functions as a guide portion (i.e., functional-member-side guide recessed portion) for guiding the assembling.

Figure 15:
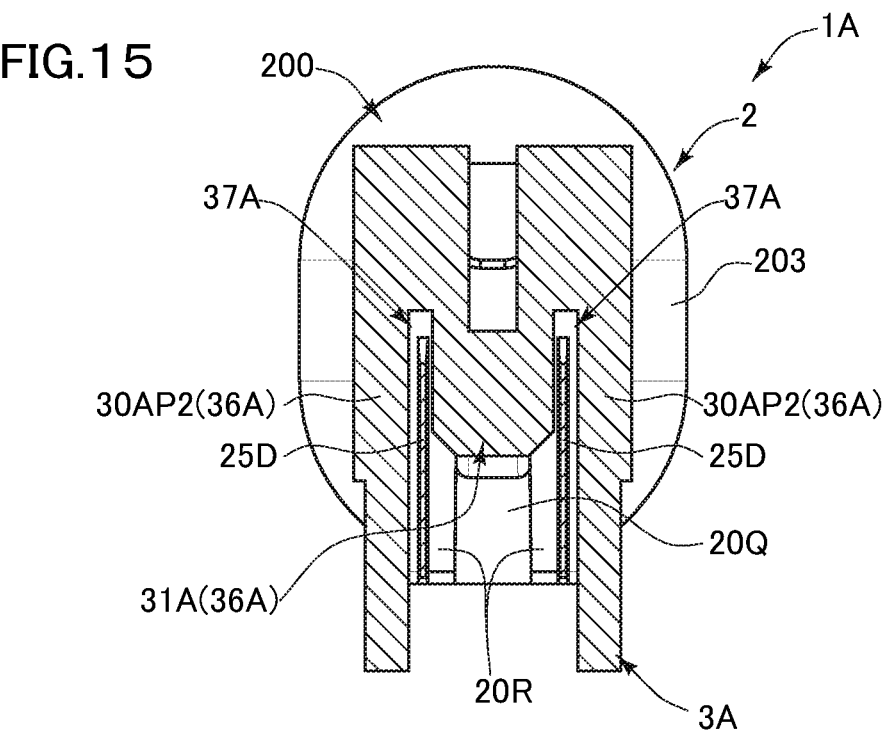
FIG. 15 is an XV-XV sectional view in FIG. 13.

As shown in FIG. 15, the elastic engagement portion 31A of the first functional member 3A is an elastic wall portion connecting the opposed wall portions 30AP, 30AP on the far side in the assembling direction 2X and extending toward the near side in the assembling direction 2X while being spaced by gaps from the opposed wall portions 30AP, 30AP. The elastic engagement portion 31A (i.e., first elastic engagement portion) has, at the distal end thereof, an engagement nail portion 31PA protruding in the upward direction 2z1 (see FIG. 17).

As shown in FIG. 21, similarly, also the elastic engagement portion 31B of the second functional member 3B is an elastic wall portion connecting the upper opposed portions 30BQ, 30BQ on the far side in the assembling direction 2X and extending toward the near side in the assembling direction 2X while being spaced by gaps from the upper opposed portions 30BQ, 30BQ. The elastic engagement portion 31B (i.e., second elastic engagement portion) has, at the distal end thereof, an engagement nail portion 31PB protruding in a downward direction 2z2 (see FIG. 23).

Here, an assembling method for assembling the functional member 3A, 3B to the mounting member 2 will be described, mainly using FIG. 17 and FIG. 23.

First, as shown at an upper stage in FIG. 17 and FIG. 23, the functional member 3A, 3B is caused to approach the mounting member 2 so that the elastic engagement portion 31A, 31B approaches in the predetermined assembling direction 2X toward the detachment preventing engagement portion 21.

Figure 14:
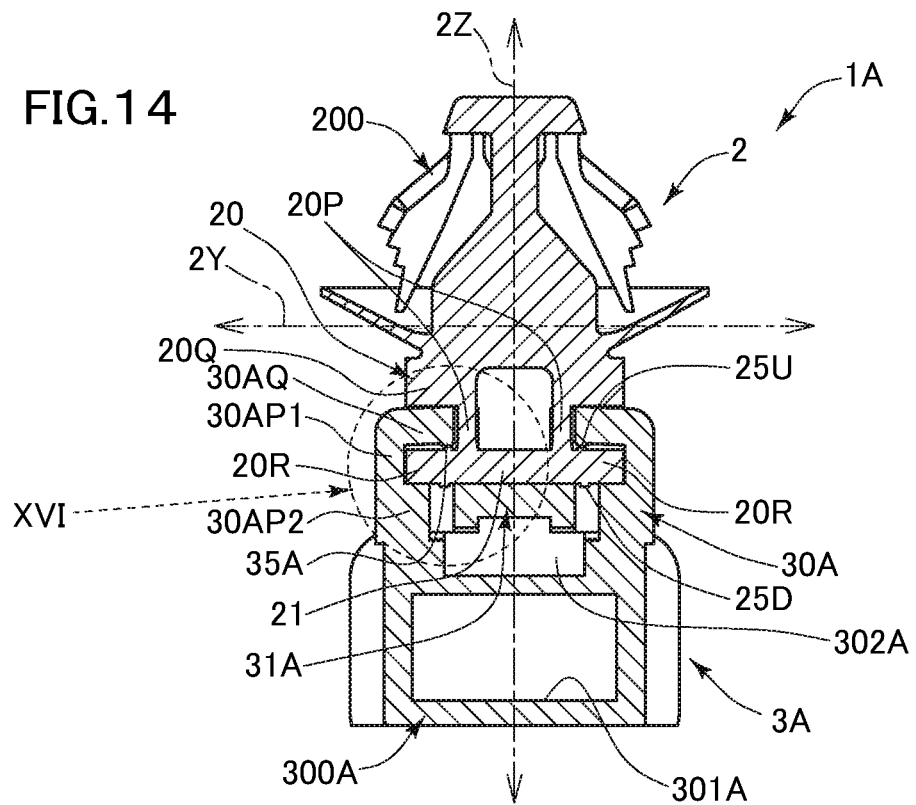
FIG. 14 is an XIV-XIV sectional view in FIG. 12.

At this time, as shown in FIG. 14 and FIG. 20, the lower opposed portions 20R, 20R of the mounting member 2 are caused to enter the opposing space formed in the fitting portion 30A, 30B of the functional member 3A, 3B.

Specifically, in the case of first functional member 3A, as shown in FIG. 17, each lower opposed portion 20R, 20R of the mounting member 2 is caused to enter the space between the upper opposed portion 30AQ and the lower opposed wall portion 30AP2. In the case of second functional member 3B, as shown in FIG. 23, each lower opposed portion 20R, 20R of the mounting member 2 is caused to enter the space between the upper opposed portion 30BQ and the upper end portion 302B of the connector portion 300B. Thus, the functional member 3A, 3B moves in a predetermined attitude into the far side in the assembling direction 2X while being guided by the fitting portion 30A, 30B, and thereby the functional member 3A, 3B (i.e., fitting portion 30A, 30B) and the mounting member 2 (i.e., lower opposed portions 20R, 20R) are to be fitted to each other.

In addition, at this time, as shown in FIG. 14 and FIG. 20, each upper opposed portion 30AQ, 30BQ of the functional member 3A, 3B is also caused to enter the opposing space formed in the fitting portion 20 of the mounting member 2.

Specifically, in the case of first functional member 3A, as shown in FIG. 17, the upper opposed portions 30AQ, 30AQ are caused to enter the spaces between the upper wall portion 20Q and the lower opposed portions 20R, 20R of the mounting member 2. In the case of second functional member 3B, as shown in FIG. 23, the upper opposed portions 30BQ, 30BQ are caused to enter the spaces between the upper wall portion 20Q and the lower opposed portions 20R, 20R of the mounting member 2. Thus, the functional member 3A, 3B moves in a predetermined attitude into the far side in the assembling direction 2X while being guided by the fitting portion 20, and thereby the functional member 3A, 3B (i.e., upper opposed portion 30AQ, 30BQ) and the mounting member 2 (i.e., fitting portion 20) are to be fitted to each other.

In this way, as the fitting of the functional member 3A, 3B and the mounting member 2 is progressed so that the functional member 3A, 3B and the mounting member 2 further approach each other, the engagement nail portion 31PA, 31PB at the distal end of the elastic engagement portion 31A, 31B of the functional member 3A, 3B comes into contact with the detachment preventing engagement portion 21 of the mounting member 2.

As shown in FIG. 17, a contact surface 31a of the engagement nail portion 31PA that contacts with the detachment preventing engagement portion 21 is formed to be a slope surface sloped upward from the distal end in the assembling direction 2X toward the opposite side (i.e., toward the left side in FIG. 17) so as to prompt the elastic engagement portion 31A to elastically deform in the downward direction (i.e., first elastic deformation direction) 2Z2).

On the other hand, as shown in FIG. 23, a contact surface 31b of the engagement nail portion 31PB that contacts with the detachment preventing engagement portion 21 is formed to be a slope surface sloped downward from the distal end in the assembling direction 2X toward the opposite side (i.e., toward the left side in FIG. 23) so as to prompt the elastic engagement portion 31B to elastically deform in the upward direction (i.e., second elastic deformation direction) 2z1.

From this contact state, as the functional member 3A, 3B further approaches the mounting member 2, the elastic engagement portion 31A, 31B causes elastic deformation as shown at the middle stage in FIG. 17 and FIG. 23. Here, the elastic deformation of the elastic engagement portion 31A occurs in the downward direction 2z2, and the elastic deformation of the elastic engagement portion 31B occurs in the upward direction 2z1. The elastic engagement portion 31A, 31B further moves into the far side in the assembling direction 2X while having the elastic deformation, to ride over the detachment preventing engagement portion 21. After riding over the detachment preventing engagement portion 21, the elastic engagement portion 31A, 31B is elastically restored to be engaged with the detachment preventing engagement portion 21 as shown at the lower stage in FIG. 17 and FIG. 23. Specifically, the engagement nail portion 31PA, 31PB of the elastic engagement portion 31A, 31B comes into the far side in the assembling direction 2X of the detachment preventing engagement portion 21, thereby to be locked in the direction opposite to the assembling direction 2X with respect to the detachment preventing engagement portion 21. That is, the functional member 3A, 3B comes into a detachment-prevented state in which the functional member 3A, 3B is prevented from being detached from the mounting member 2.

However, in this state, rattling can occur between the functional member 3A, 3B and the mounting member 2 that are assembled to each other in a detachment-prevented state as described above. That is, normally, a slight gap for facilitating the fitting is provided between the fitting portion 30A, 30B of the functional member 3A, 3B and each lower opposed portion 20R, 20R of the mounting member 2. Similarly, a slight gap for facilitating the fitting is provided also between the upper opposed portion 30AQ, 30BQ of the functional member 3A, 3B and the fitting portion 20 of the mounting member 2. Thus, after the detachment-prevented state is established as described above, due to the presence of the slight gaps, rattling occurs between the functional member 3A, 3B and the mounting member 2.

Figure 16:
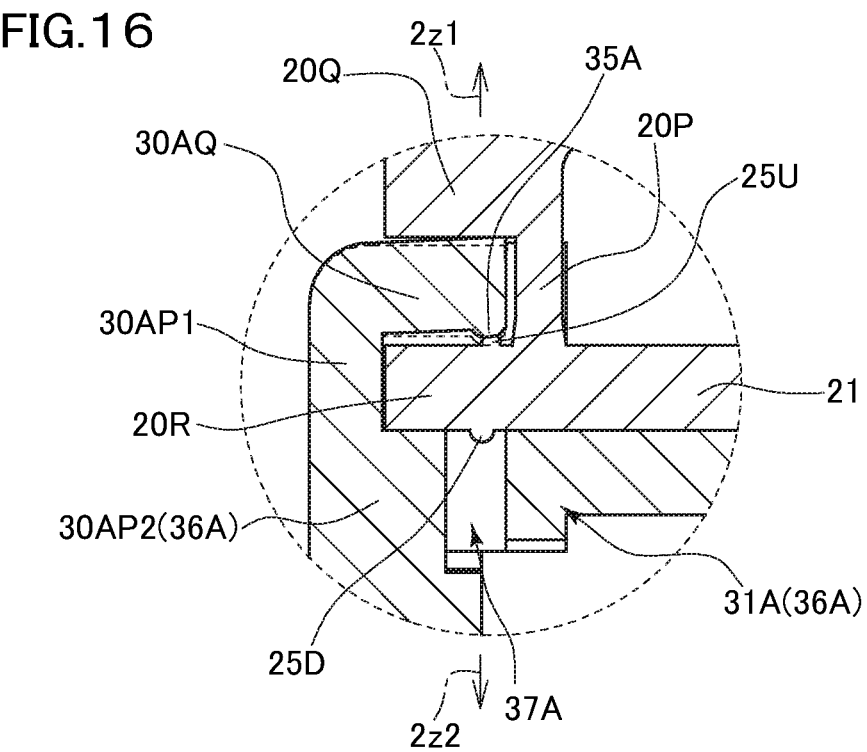
FIG. 16 is an enlarged view of part XVI in FIG. 14.

In contrast, as shown in FIG. 16, the mounting member 2 of the embodiments has a first rattling preventing protrusion 25U protruding in the upward direction 2z1 (i.e., second elastic deformation direction), and a second rattling preventing protrusion 25D protruding in the downward direction 2z2 (i.e., first elastic deformation direction). Thus, the mounting member 2 presses the functional member 3A, 3B by these protrusions 25U, 25D, whereby rattling can be prevented.

Figure 7:
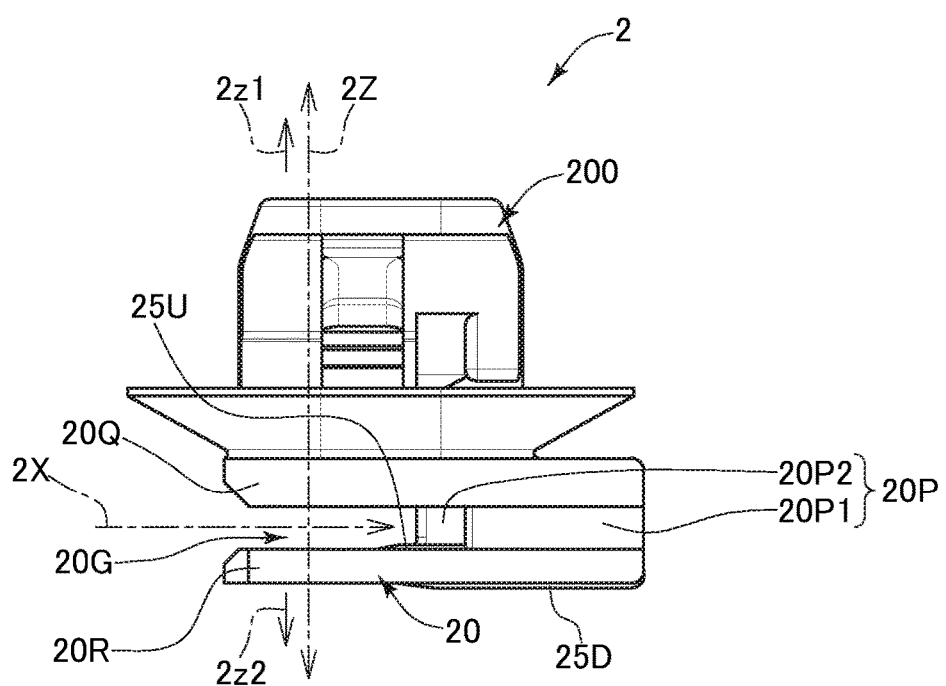
FIG. 7 is a left side view of the mounting member shown in FIG. 4.

As shown in FIG. 7, the first rattling preventing protrusion 25U here is a rib formed to extend in the assembling direction 2X so as to protrude in the upward direction 2z1 from the upper surface of each lower opposed portion 20R, 20R. In addition, as shown in FIG. 5, the second rattling preventing protrusion 25D here is a rib which is formed to extend in the assembling direction 2X so as to protrude in the downward direction 2z2 from the lower surface of each lower opposed portion 20R, 20R, and which has a curved surface (here, semi-cylindrical surface) on the protruding end side.

In addition, as shown in FIG. 17 and FIG. 23, the opposed wall portions 20P, 20P here are formed locally on the far side (right side in the drawing) in the assembling direction 2X, and as shown in FIG. 5 and FIG. 7, have far-side wall portions 20P1, 20P1 located on the far side, and protruding wall portions 20P2, 20P2 protruding toward the near side in the assembling direction 2X while being located on the inner side in the opposing direction 2Y, from the far-side wall portions 20P1, 20P1. The ribs corresponding to the first rattling preventing protrusions 25U are formed on the outer sides in the opposing direction 2Y of the protruding wall portions 20P2, 20P2 so as to extend toward the far-side wall portions 20P1, 20P1, to be connected to the far-side wall portions 20P1, 20P1, and these ribs have curved surfaces (here, semi-cylindrical surfaces) on the protruding end sides thereof.

When the first functional member 3A is assembled to the mounting member 2, as shown in FIG. 16, the first rattling preventing protrusion 25U is in contact with the upper opposed portion 30AQ, of the first functional member 3A, which is at the opposed position on the upward direction 2z1 side in the detachment-prevented state, and the first rattling preventing protrusion 25U is crushed with the first functional member 3A pressed in the upward direction 2z1. By this pressing, the upper opposed portion 30AQ of the first functional member 3A in the detachment-prevented state is elastically deformed with the distal end side thereof pressed in the upward direction 2z1. By an elastic restoration force due to the elastic deformation, the mounting member 2 is clamped and pressurized between the lower opposed wall portions 30AP2 and the upper opposed portion 30AQ. By this clamped-pressurized state, rattling between the mounting member 2 and the first functional member 3A is prevented.

Figure 22:
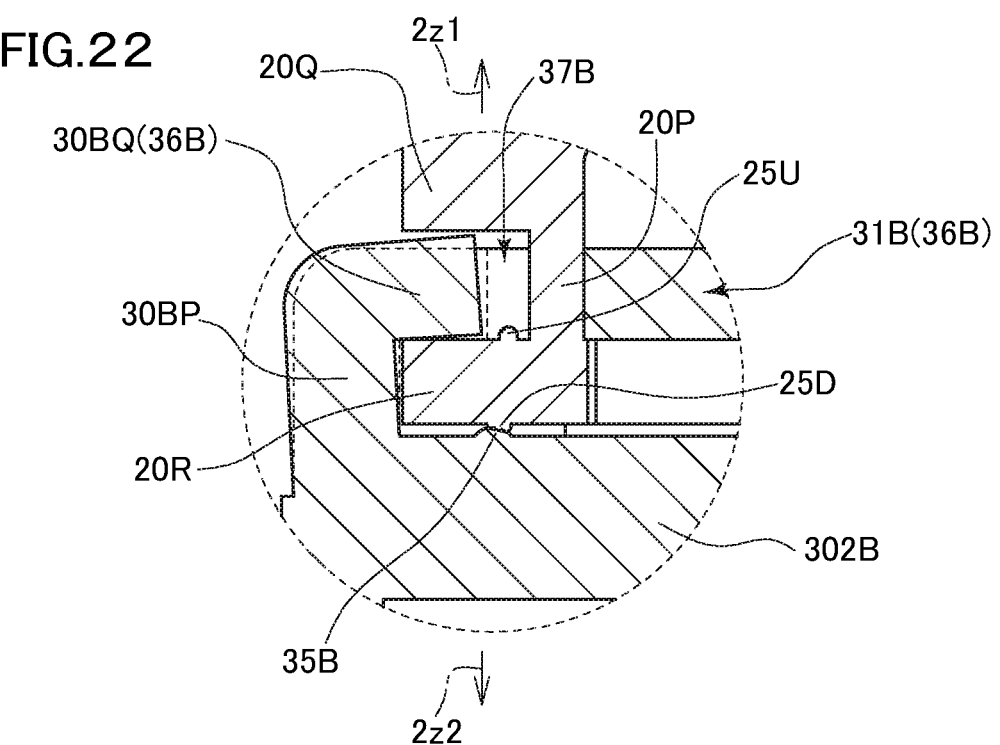
FIG. 22 is an enlarged view of part XXII in FIG. 20.

On the other hand, when the second functional member 3B is assembled to the mounting member 2, as shown in FIG. 22, the second rattling preventing protrusion 25D is in contact with the upper end portion 302B, of the connector portion 300B of the second functional member 3B, which is at the opposed position on the downward direction 2z2 side in the detachment-prevented state, and the second rattling preventing protrusion 25D is crushed with the second functional member 3B pressed in the downward direction 2z2. By this pressing, the upper opposed portion 30BQ of the second functional member 3B in the detachment-prevented state is elastically deformed with the distal end side thereof pressed in the upward direction 2z1. By an elastic restoration force due to the elastic deformation, the mounting member 2 is clamped and pressurized between the upper end portion 302B of the connector portion 300B and the upper opposed portion 30BQ. By this clamped-pressurized state, rattling between the mounting member 2 and the second functional member 3B is prevented.

It is noted that the pressing by the rattling preventing protrusions 25U, 25D occurs after the elastic engagement portion 31A, 31B starts to elastically deform in fitting of the mounting member 2 and the functional member 3A, 3B. Thus, elastic deformation of the elastic engagement portion 31A, 31B and pressing by the rattling preventing protrusions 25U, 25D do not occur at the same time, and load of assembling is prevented from suddenly increasing, whereby the fitting is facilitated. In addition, the rattling preventing protrusions 25U, 25D are formed to be slope portions in which the protrusion amounts decrease toward the near side in the assembling direction 2X. Thus, in fitting of the mounting member 2 and the functional member 3A, 3B, load of assembling is prevented from suddenly increasing from the point at which the pressing by the rattling preventing protrusions 25U, 25D is started, whereby the fitting is facilitated.

The first functional member 3A here has a contact portion 35A to be pressed in contact with the first rattling preventing protrusion 25U, as a protrusion 35A protruding toward the rattling preventing protrusion 25U. On the other hand, the second functional member 3B has a contact portion 35B to be pressed in contact with the second rattling preventing protrusion 25D, as a protrusion 35B protruding toward the rattling preventing protrusion 25D. That is, instead of being pressed in contact with surfaces, the rattling preventing protrusions 25U, 25D are structured to be pressed in a point/line contact manner to the protrusions 35A, 35B which are similar to the rattling preventing protrusions 25U, 25D. Thus, sliding resistance in fitting of the mounting member 2 and the functional member 3A, 3B is reduced and assembling is facilitated. It is noted that the protrusions 35A, 35B here are ribs formed to extend in the same direction as the rattling preventing protrusions 25U, 25D to contact therewith, and having curved surfaces (here, semi-cylindrical surfaces) on the protruding end sides thereof.

In addition, the first functional member 3A here has a first reception portion 36A which receives the second rattling preventing protrusion 25D so as not to cause pressing thereto when the first functional member 3A is in a detachment-prevented state with respect to the mounting member 2. On the other hand, the second functional member 3B has a second reception portion 36B which receives the first rattling preventing protrusion 25U so as not to cause pressing thereto when the second functional member 3B is in a detachment-prevented state with respect to the mounting member 2. Owing to the presence of the reception portions 36A, 36B, not both of the rattling preventing protrusions 25U, 25D protruding upward and downward but only one of them works to prevent rattling. Thus, increase in sliding resistance in fitting of the mounting member 2 and the functional member 3A, 3B is suppressed, and assembling is facilitated.

The reception portions 36A, 36B here are respectively formed by the elastic engagement portions 31A, 31B of the first functional member 3A and the second functional member 3B, and the opposed portions 30AP2, 30BQ (i.e., lower opposed wall portions 30AP2, upper opposed portions 30BQ) at the opposed positions on both sides thereof (i.e., both sides of the elastic engagement portions 31A, 31B in the perpendicular direction 2Y perpendicular to the assembling direction 2X and the up-down direction (which can be also said to be an elastic deformation direction) 2Z). Thus, a gap 37A, 37B serving as a reception space is formed between the elastic engagement portion 31A, 31B and the opposed portion 30AP2, 30BQ which are opposed to each other. The gaps 37A, 37B on both sides of the elastic engagement portion 31A, 31B are formed by cutouts provided from the distal end side of the elastic engagement portion 31A, 31B toward the base end side thereof in order to allow the near side of the elastic engagement portion 31A, 31B to elastically deform in the up-down direction 2Z using the distal end side thereof in the assembling direction 2X as a basis. The gaps 37A, 37B here penetrate in the up-down direction 2Z and are opened on the assembling direction 2X side. That is, the gaps 37A, 37B are essential structures for causing the elastic engagement portion 31A, 31B to elastically deform, and here, the essential structures are used also as the reception portions 36A, 36B.

Although the embodiments of this invention have been described above, the embodiments are merely illustrative, this invention is not limited thereto, and various modifications such as additions and omissions may be made on the basis of the knowledge of a person skilled in the art without departing from the scope of the claims.

DESCRIPTION OF THE REFERENCE CHARACTERS 1A, 1B assembly-type vehicle component
2 mounting member
200 vehicle body mounting portion
21 detachment preventing engagement portion
25U first rattling preventing protrusion
25D second rattling preventing protrusion
3A first functional member
31A elastic engagement portion
36A first reception portion
300A predetermined function portion (connector portion)
3B second functional member
31B elastic engagement portion
36B second reception portion
300B predetermined function portion (connector portion)

What is claimed is:

1. An assembly-type vehicle component comprising:
    a mounting member configured to be mounted to a vehicle body side; and
    a functional member having a predetermined function,
    wherein the mounting member is provided with a detachment preventing engagement portion configured to be engaged with an engagement portion of the functional member to bring the functional member into a detachment-prevented state,
    the functional member includes, as the engagement portion, an elastic engagement portion configured to, when being caused to approach in a predetermined direction toward the detachment preventing engagement portion, ride over the detachment preventing engagement portion while being elastically deformed in a direction perpendicular to the predetermined direction, and after riding over the detachment preventing engagement portion, be elastically restored to be engaged with the detachment preventing engagement portion, thereby establishing the detachment-prevented state with respect to the mounting member, the functional member including: a first functional member in which the elastic deformation of the elastic engagement portion is caused in a first elastic deformation direction; and a second functional member in which the elastic deformation of the elastic engagement portion is caused in a second elastic deformation direction opposite to the first elastic deformation direction, each of the first functional member and the second functional member being capable of being brought into the detachment-prevented state with respect to the mounting member,
    the mounting member includes: a first rattling preventing protrusion protruding in the second elastic deformation direction and configured to press, in the second elastic deformation direction, the first functional member in the detachment-prevented state; and a second rattling preventing protrusion protruding in the first elastic deformation direction and configured to press, in the first elastic deformation direction, the second functional member in the detachment-prevented state,
    the first functional member includes a first reception portion configured to receive the second rattling preventing protrusion so as not to cause pressing to the first functional member when the first functional member is in the detachment-prevented state with respect to the mounting member, and
    the second functional member includes a second reception portion configured to receive the first rattling preventing protrusion so as not to cause pressing to the second functional member when the second functional member is in the detachment-prevented state with respect to the mounting member.

2. The assembly-type vehicle component according to claim 1, wherein
    the first functional member and the second functional member each have gaps on both sides, of each elastic engagement portion, in a perpendicular direction perpendicular to the predetermined direction and the respective elastic deformation direction, the gaps being used as the respective reception portions.

* * * * *